United States Patent [19]

Walker

[11] 3,896,068

[45] July 22, 1975

[54] PRINTABLE ANTI-BLOCKING RESINOUS BLOCK COPOLYMER

[75] Inventor: John H. Walker, Bartlesviille, Okla.

[73] Assignee: Phillips Petroleum Company, Bartlesville, Okla.

[22] Filed: Apr. 15, 1974

[21] Appl. No.: 460,936

[52] U.S. Cl...... 260/28.5 B; 117/47 A; 260/23.5 R; 260/876 B
[51] Int. Cl............................................. C08c 11/70
[58] Field of Search....... 260/28.5 B, 876 B, 23.5 R; 117/47 A

[56] References Cited

UNITED STATES PATENTS

| | | | |
|---|---|---|---|
| 3,678,134 | 7/1972 | Middlebrook | 260/876 B |
| 3,766,114 | 10/1973 | Walker et al. | 260/876 B |

*Primary Examiner*—Melvyn I. Marquis

[57] ABSTRACT

A resinous block copolymer having an anti-blocking agent incorporated therein, which copolymer is made printable by the incorporation of a small amount of an olefin polymer.

11 Claims, No Drawings

PRINTABLE ANTI-BLOCKING RESINOUS BLOCK COPOLYMER

BACKGROUND OF THE INVENTION

This invention relates to resinous block copolymers.

Many plastic materials exhibit surface characteristics such that printing inks, labels, and the like do not adhere satisfactorily. In many instances it is possible to improve the adherence characteristics of the substrate by subjecting same to an oxidative print treatment technique utilizing a flame, a corona discharge, an oxidizing acid, or the like. One new class of polymers, resinous block copolymers, is becoming of increasing commercial significance. In many instances these polymers require an anti-blocking agent to prevent surfaces thereof from sticking together. With such polymers conventional print treating techniques are not entirely satisfactory because of the presence of the anti-blocking agent which not only prevents the surfaces of the polymer from sticking together, but also prevents the adherence of printing inks, labels and the like even after a standard print treatment.

SUMMARY OF THE INVENTION

It is an object of this invention to provide printable resinous block copolymer; it is yet a further object of this invention to provide printable resinous block copolymer which has good blocking characteristics; it is yet a further object of this invention to avoid the deleterious effect on printability caused by anti-blocking agents; and it is still yet a further object of this invention to provide a clear printable anti-blocking resinous block copolymer.

In accordance with this invention, a resinous block copolymer is provided having an anti-blocking agent therein and a small amount of an olefin polymer.

DESCRIPTION OF THE PREFERRED EMBODIMENTS

The resinous block copolymer can be any resinous block copolymer of a conjugated diene and a monovinyl-substituted aromatic compound.

Suitable conjugated dienes or mixtures thereof that can be employed include those having 4–12 carbon atoms per molecule, those containing 4–8 carbon atoms being preferred. Exemplary of suitable compounds are 1,3-butadiene, isoprene, 2,3-dimethyl-1,3-butadiene, piperylene, 3-butyl-1,3-octadiene, phenyl-1,3-butadiene, and the like, 1,3-butadiene being particularly preferred.

The monovinyl-substituted aromatic compounds are those containing 8–18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 1-vinylnaphthalene, 2-vinylnaphthalene, and the like, styrene being preferred.

The polymers can be of either an A-B configuration, an A-B-A configuration, or a coupled radial (AB)-(BA)$_n$ configuration where $n$ is 2 or more, preferably 2 or 3. The coupling agent is disregarded in the last formula since it is so small compared with the length of the polymer chains. This latter formula can also be expressed X(BA)$_n$ where X is the coupling agent and $n$ is greater than 2. The A is the resinous monovinyl-substituted aromatic compound block which can optionally have incorporated therein a small amount of a comonomer. The B is a rubbery diene block, which optionally can have some comonomer incorporated therein, the B blocks being insufficient to cause the total block copolymer to be rubbery.

By resinous is meant a normally solid material not having rubbery properties. Generally such materials will have a Shore D hardness (ASTM D170661) of greater than 62, preferably greater than 69.

The preferred polymers are radial polymers, the preparation of which is broadly disclosed in Zelinski et al., U.S. Pat. No. 3,281,383 issued Oct. 25, 1966, the disclosure of which is hereby incorporated by reference, it being understood that the radial block copolymers of this invention are limited to those having resinous characteristics. Resinous block copolymers having branches of polymer which demonstrate a plurality of modes on a gel permeation chromatograph curve prior to coupling are disclosed in Kitchen et al., U.S. Pat. No. 3,639,517, issued Feb. 1, 1972, the disclosure of which is hereby incorporated by reference, are especially preferred.

Briefly the preferred resinous radial block polymers to which this invention applies can be prepared by producing a block of monovinyl-substituted aromatic compound in the presence of an organolithium initiator to give a block containing an active lithium atom on one end of the polymer chain. This living chain is then reacted with the conjugated diene monomer to give a block copolymer chain with an active lithium atom at one end thereof. This lithium-terminated copolymer is then reacted with a compound which has at least three reactive sites capable of reacting with the lithium-carbon bond and adding to the carbon possessing this bond in the polymer. The result is a polymer having relatively long branches which radiate from the nucleus formed by the polyfunctional compound which reacted with the lithium-terminated polymer.

The anti-block agent which is present in the polymer can be any conventional anti-block agent used in the art including microcrystalline waxes, stearates such as sodium stearate, alkyl amines, stearamides and the like. Most preferred are microcrystalline paraffin waxes having a melting point in the range of 180°–200°F. Such materials are sold by Bareco Division, Petrolite Corporation. The anti-block agent can be present in an amount within the range of 0.1 to 20 weight percent based on the weight of the polymer, although generally lower concentrations are used particularly where it is desired to have a final product which is clear. Preferred concentrations are in the range of 0.1 to 0.5 weight percent based on the weight of block copolymer. In accordance with this preferred embodiment samples having a haze of less than about 4.5–6 percent preferably less than about 2.5–4 percent (ASTM D1003-61 using Gardner Hazemeter) can be produced, the haze being determined on 100 mil thick injection molded specimens.

The olefin polymer is preferably a normally solid crystalline olefin polymer or copolymer such as polymers of at least one mono-1-olefin having 2–8 carbon atoms per molecule, more preferably polymer and copolymers of ethylene, propylene, and 1-butene, most preferably polyethylene. By crystalline is meant polymer having 40 percent or more, preferably 45–92 percent crystallinity as measured by wide angle X-ray diffraction.

The olefin polymer can be present in an amount within the range of 0.1 to 1 percent or more based on the weight of block copolymer, although it is preferred to utilize a concentration of 0.2 to 0.5 weight percent based on the weight of block copolymer in instances where it is desired to have a clear final product since at concentrations of about 0.5 weight percent and above, the olefin polymer causes the block copolymer to become cloudy. The most preferred concentration is about 0.2 to 0.3 weight percent based on the weight of the block copolymer.

It is essential that the articles made using the polymer of this invention be given a surface treatment of the type conventionally known in the art as "print treatment". The preferred print treatment to be used on the polymers of this invention is flame treatment using an oxidizing flame although any type of conventional flame treatment, acid treatment, or corona discharge known in the art for producing a printable surface can be utilized. These techniques are shown for instance in Keller at al., U.S. Pat. No. 2,968,576, issued Jan. 17, 1961, the disclosure of which is hereby incorporated by reference.

EXAMPLE

In the following example the resinous block copolymer was a styrene-butadiene block copolymer prepared by adding cyclohexane, styrene, n-butyllithium and tetrahydrofuran to a batch reactor and polymerizing the styrene during a period of 30 minutes, the initial temperature being 130°F. A second charge of cyclohexane, n-butyllithium, and styrene was added at an initial temperature of 160°F. and the polymerization conducted for an additional hour. Thereafter a third charge comprising cyclohexane and butadiene was added at an initial temperature of 165°F. and the polymerization carried out for another hour. Thereafter Epoxonol 9-5 brand of epoxidized linseed oil having approximately five functional groups per molecule was added along with additional cyclohexane at an initial temperature of 180°F. The reactor was then emptied into isopropyl alcohol and the polymer recovered. The anti-block agent was B-Square 190/195 wax having a melting point of 190°–195°F which is a microcrystalline paraffin wax sold by Bareco. The microcrystalline wax was present in an amount of 0.25 weight percent based on the weight of the polymer in all instances.

It was completely surprising that the incorporation of a small amount of an olefin polymer would improve the adhesion since olefin polymers are among the materials which are noted themselves for having poor adhesion characteristics. Most surprising is the fact that the effect is achieved at such low concentrations that the resulting polymer is still clear.

While this invention has been described in detail for the purpose of illustration, it is not to be construed as limited thereby but is intended to cover all changes and modifications within the spirit and scope thereof.

I claim:

1. A composition comprising a resinous block copolymer of a monovinyl-substituted aromatic compound and a conjugated diene;
   0.1 to 20 weight percent based on the weight of said block copolymer of an anti-block agent; and
   0.1 to 1 weight percent based on the weight of said block copolymer of a normally solid crystalline olefin polymer.

2. A composition according to claim 1 wherein said monovinyl-substituted aromatic compound is stryene, said conjugated diene is 1,3-butadiene, and said olefin polymer has a crystallinity of at least 40 percent and is preset in an amount within the range of 0.1 to 1 weight percent.

3. A composition according to claim 2 wherein said block copolymer is prepared by contacting styrene with an organolithium initiator to form a styrene polymer block, thereafter introducing butadiene to form a copolymer chain having a styrene block, a butadiene block, and an active lithium on the end of the butadiene block and thereafter introducing a polyfunctional coupling agent.

4. A composition according to claim 3 wherein said styrene is added incrementally so as to give a polymer chain prior to coupling demonstrating a plurality of modes on a gel permeation chromatograph.

5. A composition according to claim 1 wherein said anti-block agent is a microcrystalline wax and is present in an amount within the range of 0.1 to 0.5 weight percent based on the weight of said block copolymer.

6. A composition according to claim 5 wherein said microcrystalline wax has a melting point within the range of 190°–200°F.

TABLE

| Additive | Results of Scotch Tape Peel Adhesion Test* | | | | | | | |
|---|---|---|---|---|---|---|---|---|
| | Silk Screen Vinyl | | Silk Screen Lacquer | | Silk Screen Enamel | | Flexographic Ink | |
| None - control | 0 | 0 | 0 | 0 | 0 | 1 | 0 | 1 |
| 0.25% Allied PE 617[1] | 0 | 0 | 0 | 2 | 0 | 2 | 0 | 1 |
| 0.25% Marlex" 6001 PE[2] | 0 | 0 | 0 | 0 | 0 | 2 | 0 | 2 |
| 0.25% Marlex" TR885 PE[3] | 0 | 0 | 0 | 0 | 0 | 2 | 0 | 1 |
| 0.25% Marlex" 5065 PE[4] | 0 | 0 | 0 | 0 | 0 | 2 | 0 | 1 |
| 0.25% Marlex" HGH-050-01 PP[5] | 0 | 0 | 0 | 0 | 0 | 2 | 0 | 1 |
| Flame Treatment | No | Yes | No | Yes | No | Yes | No | Yes |

Key to Rating System
0 = No adhesion, complete removal of ink.
1 = Some adhesion, partial removal of ink.
2 = Excellent adhesion, no removal of ink.
[1] Low molecular weight crystalline ethylene homopolymer 102°C softening point (ASTM E-28); 7.5 hardness (ASTM D-5); 0.91 density (g/cc) and 145 Brookfield viscosity (CPS, 140°C)
[2] 0.960 density; 0.1 melt index (ASTM D1238-62T, Condition E) ethylene homopolymer.
[3] 0.960 density, 30 melt index (ASTM D1238-62T, Condition E) ethylene homopolymer.
[4] 0.950 density, 6.5 melt index (ASTM D1238-62T, Condition E) ethylene/butene copolymer.
[5] 0.905 density, 4 melt flow (ASTM D1238-62T, Condition L) propylene homopolymer.

7. A composition according to claim 6 wherein said olefin polymer is polyethylene.

8. A composition according to claim 7 wherein said polyethylene is present in an amount within the range of 0.2 to 0.3 weight percent based on the weight of said block copolymer and the resulting composition is clear.

9. A composition according to claim 1 in the form of a shaped article the surface of which has been print treated.

10. A composition according to claim 9 wherein said print treating is done by an oxidizing flame.

11. A composition according to claim 10 wherein: said block copolymer is a polymer formed by contacting styrene with an organo-lithium initiator to form a styrene polymer block, thereafter introducing butadiene to form a copolymer chain comprising a styrene block, a butadiene block and an active lithium on the end of the butadiene block and thereafter introducing a polyfunctional coupling agent; said anti-block agent is a microcrystalline paraffin wax having a melting point in the range of 190° to 200°F, said wax being present in an amount within the range of 0.1 to 0.5 weight per cent based on the weight of said block copolymer; and said olefin polymer is polyethylene.

* * * * *